United States Patent Office 3,639,512
Patented Feb. 1, 1972

3,639,512
PROCESS FOR PREPARING AN IMPACT RESISTANT VINYL CHLORIDE RESIN COMPOSITION
Katsumi Sugimoto and Sachio Fukui, Yokohama, Japan, assignors to The Japanese Geon Company, Ltd., Tokyo, Japan
No Drawing. Filed Apr. 10, 1967, Ser. No. 629,360
Claims priority, application Japan, Apr. 15, 1966, 41/23,504
Int. Cl. C08f 15/00, 29/24, 37/00
U.S. Cl. 260—878 R
5 Claims

ABSTRACT OF THE DISCLOSURE

A process for preparing a vinyl chloride resin composition, characterized by polymerizing a monomer mixture of vinyl chloride and at least one monomer selected from the group consisting of alkylvinyl ether, ethylene, propylene and butene, in the presence of a copolymer of ethylene and vinyl ester or acrylic acid ester. Such vinyl chloride resin compositions per se exhibiting excellent impact strength, weatherability, heat stability and processability are also provided.

---

This invention relates to a process for preparing a vinyl chloride resin composition excellent in impact resistance, weatherability, heat stability and processability. More particularly, this invention relates to a process for preparing a vinyl chloride resin composition excellent in impact resistance, weatherability, heat stability and processability by polymerizing a mixture of vinyl chloride and at least one kind of monomer selected from the group consisting of vinyl ether, ethylene, propylene and butene in the presence of a copolymer of ethylene and a vinyl ester or an acrylic acid ester.

Heretofore, as a process for improving impact strength of vinyl chloride resin, a process of blending polyvinyl chloride with various elastomers and a process for polymerizing vinyl chloride in the presence of an elastomer have been carried out. In these processes as an elastomer, an elastomer of the diene series, for instance, poly butadiene, a styrene-butadiene copolymer, a styrene-acrylonitrile-butadiene terpolymer or a styrene-methyl methacrylate-butadiene terpolymer has been mainly used. However, because each of these elastomers has a double bond, it brings about various shortcomings to the final products of these resin compositions. Namely, by ultraviolet ray and heat a double bond of diene contained in the resin composition is easily cross-linked and decomposed thereby elastic character of resin is lost, as a result impact resistance of the product suddenly lowers or the product is colored. Moreover, because there are large amounts of gel structure, the elastomers disperse non-uniformly upon mix kneading by roll or extrusion processing, resulting in shortcomings that surface smoothness and luster of the shaped article become inferior. With a view to preventing lowering of weatherability, attempts such as making small the content of diene in a diene copolymer or utilizing an elastomer of the non-diene series have been made, however, all of these attempts have been unsatisfactory in respect of aging resistance, discoloration resistance and processability. Also for improving processability and surface of the product, addition of a lubricant, a plasticizer and a processing assistant such as butyl stearate, dioctyl phthalate and polymethyl methacrylate has been carried out, however, the result being lowering of the physical properties of the product, therefore, these processes are also unsatisfactory.

Recently, it has been reported to blend polyvinyl chloride with chlorinated polyethylene or chlorinated EPR (ethylene propylene rubber) instead of an elastomer of the diene series. However, because each of these blending substances damages heat stability of polyvinyl chloride, this process has hardly been practiced.

Also use of a vinyl chloride-acrylic acid ester copolymer and an ethylene-vinyl acetate copolymer instead of an elastomer of the diene series has been proposed, however, because these copolymers have shortcomings of lowering heat stability of polyvinyl chloride, making the product opaque and worsening surface of the extruded or molded articles, they are also unsatisfactory.

Accordingly, an object of this invention is to provide vinyl chloride resin composition excellent in impact resistance, weatherability, heat stability and processability by improving shortcomings such as deterioration due to ultraviolet ray, coloration, lowering of processability and lowering of heat stability brought about by an elastomer of the diene series or chlorinated polymers as well as such shortcoming as mentioned above brought about by using a vinyl chloride-acrylic acid ester copolymer or an ethylene-vinyl ester copolymer, namely, lowering of heat stability and rough surface of extruded or molded articles.

A vinyl chloride resin composition meeting such object of this invention is obtained, as mentioned above, by polymerizing a mixture of vinyl chloride and at least one kind of monomer selected from the group consisting of vinyl ether, ethylene, propylene and butene in the presence of a copolymer of ethylene and vinyl ester or acrylic acid ester.

A resin composition obtained by polymerizing vinyl chloride only in the presence of a small amount of ethylene copolymer elastomer has a melt viscosity generally lower than that of polyvinyl chloride, however, an extruded or molded article or a calender sheet thereof has rough surface and cannot be offered for actual use. As one process for improving this shortcoming, the present inventors examined grafting a copolymerizable monomer with vinyl chloride to an ethylene copolymer elastomer, and when a mixture of vinyl chloride and a small amount of one kind of monomer selected from the group consisting of vinyl ether, ethylene, propylene and butene was polymerized in the presence of an ethylene copolymer elastomer, unexpectedly the obtained vinyl chloride composition was excellent in impact resistance and heat stability as well as external view of the shaped article and could sufficiently achieve the object of this invention, thus the present inventors have completed this invention. Even if together with vinyl chloride, vinyl ester of fatty acid such as vinyl acetate, acrylic acid alkyl esters such as ethyl acrylate, dialkyl esters of unsaturated dibasic acid such as maleic acid, fumaric acid and itaconic acid or other monomers copolymerizable with vinyl chloride are polymerized in the presence of an ethylene copolymer, only a resin composition unsatisfactory in impact resistance and heat stability can be obtained.

The aforesaid ethylene copolymer elastomer is a copolymer elastomer of ethylene and vinyl ester or acrylic acid ester represented by the formula $$CH_2=CH-A$$

wherein A stands for —O—COR group or —COOR group and R stands for an alkyl group having 1–20 carbon atoms. As examples of these monomers copolymerizable with ethylene, there may be cited vinyl acetate, vinyl propionate, vinyl laurate, methyl acrylate, ethyl acrylate and 2-ethylhexyl acrylate, however, what is especially preferable is a monomer wherein number of carbon atoms of the alkyl group is from 1 to 3. In case a monomer containing relatively many carbon atoms is used, in order to make the ethylene copolymer elastomer have a proper compatibility with vinyl chloride, the ratio of such monomer to ethylene must be made large, and in this case the obtained product tends to become opaque.

The ethylene copolymer in this invention may contain these vinyl esters or acrylic acid esters singly or in combination of these two or together with another copolymerizable monomer, moreover, in combination of at least two monomers having different numbers of alkyl carbon atoms. Concerning monomer composition of the copolymer of ethylene and said vinyl ester or acrylic acid ester, it is desirable to make the copolymer contain vinyl ester or acrylic acid ester within the range of 15–80% by weight. Especially, in case of vinyl ester or acrylic acid ester having an alkyl group having 1–3 carbon atoms, in order to make the ethylene copolymer elastomer have such compatibility with a graft monomer mixture consisting mainly of vinyl chloride as is necessary for improvement of impact resistance and processability of the objective resin composition, its content in the copolymer is preferably within the range of 25–70% by weight.

The graft monomer in this invention is a mixture of vinyl chloride and a small amount of vinyl ether, ethylene, propylene or butene. By this graft polymerization, polyvinyl chloride resin composition comprising a graft copolymer wherein these monomers graft on said ethylene copolymer, copolymer of these monomers and non-grafted ethylene copolymer (hereinafter may be referred to merely as graft copolymer or grafted product) is formed.

As vinyl ether, a relatively long chain alkyl vinyl ether whose alkyl group has 4–18 carbon atoms, for instance, n-butylvinylether, 2-ethylhexylvinylether, laurylvinylether and stearylvinylether is preferable. And butene includes butene-1, cis- or trans-butene-2- and isobutene.

The ratio of these copolymerizable monomers used together with vinyl chloride monomer is within the range of 0.1–10% by weight, preferably 0.5–4% by weight based on the monomer mixture. The ratio above 10% by weight is undesirable because the polymerization reaction becomes slow and the softening point of the produced vinyl chloride resin lowers. And when the ratio is below 0.1% by weight, the effect of this invention is not developed. As consumption rate of an alkyl vinyl ether is slower than that of vinyl chloride and when a relatively large amount of the former is used it remains unreacted, therefore, it is preferable to additionally add vinyl chloride on the way of the polymerization so that no alkyl vinyl ether may be remained.

What should be emphasized in this invention, is as compared with the case wherein vinyl chloride only is grafted, external view of the final product, extrusion processability and transparency of the shaped article are remarkably improved. The ratio of an ethylene copolymer to be used in the graft copolymerization may be varied within the range of 0.5–40% by weight, especially preferably 3–20% by weight based on the final grafted product.

The graft polymerization reaction in the process of this invention may be either suspension polymerization or solution polymerization initiated with an organic peroxide such as benzoyl peroxide, lauroyl peroxide and ditertiary butyl peroxide or an azo compound such as $\alpha,\alpha'$-azobisisobutyronitrile, and it is also possible by emulsion polymerization by a water-soluble catalyst such as hydrogen peroxide, ammonium persulfate or potassium persulfate.

In the suspension polymerization, an ordinary suspension dispersing agent such as polyvinyl alcohol, cellulose derivative, gelatin or a copolymer of vinyl acetate and maleic acid anhydride is used, while in the solution polymerization a solvent having a relatively small chain transfer coefficient such as a hydrocarbon of the petroleum series like butane, pentane, n-hexane and n-heptane, an aromatic hydrocarbon like benzene and toluene or an ester like ethyl acetate and butyl acetate is advantageously used. As an emulsifier in the emulsion polymerization, an anion surface active agent such as higher alcohol sulfate, alkyl aryl sulfonate and an alkali salt of fatty acid, and a nonion surface active agent such as polyoxyethylene alkyl ether, polyoxyethylene alkyl ester and sorbitan ester are advantageously used.

The most preferable polymerization process of this invention is a process of dissolving the copolymer elastomer together with a catalyst in a monomer mixture, dispersing this solution in an aqueous medium by using a proper dispersing agent such as gelatin, polyvinyl alcohol or methyl cellulose, thereafter polymerizing the suspension under ordinary polymerization conditions. After filtration and drying, powdery product is obtained. According to this process, a step for covering a solvent or coagulating a latex is not required. And said process is capable of obtaining a graft copolymer most preferable in handling and processability.

The polymerization catalyst is normally used in an amount of 0.05–3% by weight based on the monomer to be polymerized. The polymerization temperature is preferably a normal temperature adopted upon polymerization of vinyl chloride, namely, a temperature of 20–80° C.

The vinyl chloride resin composition prepared according to this invention has an impact strength of 4–5 times in Charpy test, and the melting temperature lower by about 20–30° C. as compared with vinylchloride homopolymer, and said composition gives extruded or molded article and calender sheet, etc. remarkably excellent in surface smoothness and non-detractive on aging.

In the following examples will be found specific embodiment of the invention. All parts or percent are based by weight.

EXAMPLES 1–6

|  | Parts |
|---|---|
| Monomer mixture to be grafted | 95 |
| Ethylene-vinyl acetate copolymer | 5 |
| Water | 450 |
| Polyvinyl alcohol | 0.3 |
| Lauroyl peroxide | 0.1 |
| Polyoxyethylenesorbitan monolaurate | 0.01 |

The aforesaid components were charged in a stainless autoclave whose inside was substituted by nitrogen, after they were well stirred, the contents were reacted at 60° C. for 14 hours. By filtering and drying the obtained suspended matter, powdery graft products were obtained. Kind of the ethylene-vinyl acetate copolymer, composition of the monomer mixture to be grafted and physical properties of the products were shown in Table 1. However, in Examples 1, 2, 4 and 5 the vinyl ether content of whose monomer mixture was 3 parts, at first 80% of the vinyl chloride and the entire vinyl ether were charged, and when the reaction proceeded 85%, the remaining vinyl chloride was charged to be reacted to prevent the unreacted vinyl ether from remaining in the reaction system.

One hundred parts of the so obtained graft polymers, 3 parts of dibutyl tin maleate and 0.5 part of calcium stearate were mixed and compounded on hot roll at 150° C., pressed at 160° C. and test samples were prepared.

The impact strength was determined with a notched 10 x 10 x 90 mm. test sample using a Charpy impact tester at relative humidity of 60% and 20° C. The flow temperature was expressed by a temperature where the compound showed a viscosity of $1 \times 10^5$ poise at constant temperature elevation at a ratio of 3° C./min. using a Koka-type flow tester. The surface of the shaped article was expressed by excellent, good and bad as compared with vinyl chloride homopolymer as a standard by observing the surface of the extruded matter with naked eyes. The heat stability was shown by a time until the test sample heated inside an air circulating-type gear oven at 180° C. was discolored to yellow. The softening temperature was measured in accordance with a soft temperature testing method of JIS (Japan Industrial Standard) K-6745.

As control samples, what grafted vinyl chloride only, what grafted a monomer mixture of vinyl chloride with vinyl acetate or 2-ethylhexyl acrylate, and vinyl chloride homopolymer were shown.

Concerning monomers to be grafted, what grafted vinyl chloride only (control samples 1 and 2) did not show much improvement in flow properties and the smoothness of the surface became worse than that of polyvinyl chloride (control sample 7) on the contrary. Also concerning monomers to be grafted, what used a small amount of vinyl acetate or 2-ethylhexylacrylate with vinyl chloride (control sample 3, 4, 5 and 6) had generally low impact resistance for rigid use more rough surface than that of the resin of this invention, extremely poor heat stability and too low softening temperature. When an ethylene-vinyl acetate copolymer was employed for raising impact strength, controls 3 and 5), improvement of processability and surface smoothness was not observed much.

In contrast, the resin composition prepared according to the process of this invention was very good in melt flow behavior, having satisfactory smooth surface, better heat stability than that of what grafted vinyl chloride only and sufficient impact resistance and softening point. Addition of only 0.5 part of vinyl ether to vinyl chloride (Examples 3 and 6) resulted in having sufficient processability and heat stability.

and the contents were reacted at 50° C. for 36 hours to obtain a graft copolymer of the vinyl chloride series having a polymerization degree of 800 (sample A) at a yield of 83%.

By the same recipe as above except using 8 parts of propylene instead of ethylene and cis-2-butene and making the amount of vinyl chloride 88 parts, the contents were reacted at 45° C. for 36 hours, thereafter the reaction was stopped to obtain a resin having a polymerization degree of 780 (sample B) at a yield of 72%. The results of testing these samples A and B as in Examples 1–6 were shown in Table 3.

TABLE 3

| | Impact strength (kg.-cm./cm.²) | Flow temperature (° C.) | Surface of shaped article | Heat stability (min.) | Softening temperature (° C.) |
| --- | --- | --- | --- | --- | --- |
| Sample A | 16.1 | 168 | Excellent | 115 | 66.5 |
| Sample B | 15.4 | 167 | do | 130 | 67.7 |

Same as in the case of vinyl ether, the cases of a monomer of the mono-olefin series such as ethylene and pro-

TABLE 1

| Composition of a monomer mixture | Kind of ethylene copolymer | Impact strength (kg.-cm./cm.²) | Flow temperature (° C.) | Surface of shaped article | Heat stability (min.) | Softening temperature (° C.) |
| --- | --- | --- | --- | --- | --- | --- |
| Example 1 — 92 parts of vinyl chloride; 3 parts of 2-ethylhexylvinyl ether | A | 8.7 | 160 | Excellent | | |
| Example 2 — do | B | 15.8 | 152.5 | do | 170 | 61 |
| Example 3 — 94.5 parts of vinyl chloride; 0.5 part of 2-ethylhexylvinyl ether | B | 16.2 | 165 | do | 150 | 67 |
| Example 4 — 92 parts of vinyl chloride; 3 parts of n-butylvinyl ether | A | 8.2 | 167 | do | 160 | 64.5 |
| Example 5 — do | B | 15.3 | 159 | do | 160 | 63.5 |
| Example 6 — 94.5 parts of vinyl chloride; 0.5 part of n-butylvinyl ether | B | 16.4 | 171.5 | do | 135 | 67.5 |
| Control 1 — 95 parts of vinyl chloride | A | 5.8 | 182 | Bad | | |
| Control 2 — do | B | 16.5 | 178 | Bad | 120 | 68 |
| Control 3 — 90 parts of vinyl chloride; 5 parts of vinyl acetate | A | 8.0 | 173 | Good | 45 | 64 |
| Control 4 — do | B | 5.2 | 168 | Excellent | | |
| Control 5 — 90 parts of vinyl chloride; 5 parts of 2-ethylhexyl acrylate | A | 11.4 | 166 | Good | 60 | 51 |
| Control 6 — do | B | 5.6 | 162 | Excellent | | |
| Control 7 — 100 parts of vinyl chloride | | 4.0 | 185 | Good | 180 | 70 |

NOTE.—Ethylene copolymer A: containing 28% by weight of vinyl acetate; ethylene copolymer B: containing 45% by weight of vinyl acetate.

The resin composition of this invention is remarkably superior to vinyl chloride resin containing an elastomer of the diene series in weatherability. For instance, when test samples of Example 3 and a vinyl chloride resin composition sample blended with a styrene-acrylonitrile-butadiene graft copolymer were placed in carbon arc weather-o-meter and aged under irradation conditions of a temperature of 40° C., an irradiation time of 120 minutes and a rain falling time of 18 minutes, Charpy impact strengths of these test samples were shown in the following Table 2.

TABLE 2

Impact strength (kg.-cm./cm.²)

| | Before test | 160 hours | 320 hours |
| --- | --- | --- | --- |
| Sample of Example 3 | 16.2 | 16.0 | 16.5 |
| Sample of 100 parts of polyvinyl chloride and 15 parts of ABS* | 15.0 | 5.0 | 2.5 |

* What is obtained by graft polymerizing styrene and acrylonitrile to polybutadiene latex.

EXAMPLE 7

Same as in Examples 1–6, a stainless autoclave whose inside was substituted by nitrogen was charged with:

| | Parts |
| --- | --- |
| Water | 320 |
| Polyvinyl alcohol | 0.25 |
| Lauroyl peroxide | 0.1 |
| Propylperoxypercarbonate | 0.03 |
| Ethylene-vinyl acetate copolymer (vinyl acetate: 45%) | 4.0 |
| Ethylene | 3.0 |
| Cis-2-butene | 1.8 |
| Vinyl chloride | 91.2 | pylene, the graft copolymer had excellent surface, good heat stability, high impact strength and good flow property.

EXAMPLES 8–11

Same as in Examples 1–6, a stainless autoclave whose inside was substituted by nitrogen was charged with:

| | Parts |
| --- | --- |
| Monomer mixture | 95 |
| Ethylene-ethyl acrylate copolymer (ethyl acrylate: 40%) | 5 |
| Water | 450 |
| Polyvinyl alcohol | 0.3 |
| Lauroyl peroxide | 0.1 |
| Polyoxyethylene sorbitan monolaurate | 0.01 | and the contents were reacted at 60° C. for 14 hours. By filtering and drying the obtained suspended matter, powdery graft products were obtained. Compositions of the monomer mixtures and their physical properties tested as in Examples 1–6 were shown in Table 4.

As control samples, what grafted vinyl chloride alone, what grafted a monomer mixture of vinyl chloride and vinyl acetate, and vinyl chloride homopolymer were shown.

Exactly same as in the case of using an ethylene-vinyl acetate copolymer, what grafted vinyl chloride only (control 8) was poor in processability, and what grafted a mixture of vinyl chloride and vinyl acetate (control 9) had low impact strength and poor heat stability. However, a resin composition grafted a mixture of vinyl chloride and vinyl ether (Examples 8–11) was excellent in impact resistance, heat stability and processability.

TABLE 4

| Composition of monomer mixture | | Impact strength (kg.-cm./cm.²) | Flow temperature (° C.) | Surface of shaped article | Heat stability (min.) | Softening temperature (° C.) |
|---|---|---|---|---|---|---|
| Example 8 | 92 parts of vinyl chloride; 3 parts of 2-ethylhexylvinyl ether | 14.8 | 153 | Excellent | 165 | 61 |
| Example 9 | 94.5 parts of vinyl chloride; 0.5 part of 2-ethylhexylvinyl ether | 16.4 | 162 | ___do___ | 150 | 66 |
| Example 10 | 92 parts of vinyl chloride; 3 parts of n-butylvinyl ether | 15.0 | 158.5 | ___do___ | 160 | 62.5 |
| Example 11 | 94.5 parts of vinyl chloride; 0.5 part of n-butylvinyl ether | 16.1 | 170 | ___do___ | 130 | 67 |
| Control 8 | 95 parts of vinyl chloride | 16.7 | 176 | Bad | 120 | 67.5 |
| Control 9 | 90 parts of vinyl chloride; 5 parts of vinyl acetate | 5.9 | 166 | Excellent | 55 | 63 |
| Control 10 | 100 parts of vinyl chloride | 4.0 | 185 | Good | 180 | 70 |

What is claimed is:

1. A vinyl chloride resin composition excellent in impact strength, weatherability, heat stability and processability obtained by polymerizing 99.5–60 parts by weight of a monomer mixture of 99.9–90% by weight of vinyl chloride and 0.1–10% by weight of at least one kind of monomer selected from the group consisting of an alkylvinyl ether whose alkyl group has 4–18 carbon atoms, ethylene, propylene and butene in the presence of 0.5–40 parts by weight of a polymer consisting of 85–20% by weight of ethylene and 15–80% by weight of a monomeric ester of the formula $$CH_2=CH-A$$

wherein A is selected from the class consisting of —OCOR group and —COOR group and R is an alkyl group having 1–20 carbon atoms.

2. The composition according to claim 1 wherein said polymerization is carried out in a suspended state.

3. The comopsition according to claim 1 wherein said polymerization is carried out by dissolving the copolymer in the monomer mixture, suspending the obtained solution in an aqueous medium and polymerizing the suspension.

4. The composition according to claim 1 wherein said copolymer is a copolymer of ethylene and ethyl acrylate.

5. The composition of claim 1 wherein said copolymer is a copolymer of ethylene and vinyl acetate.

References Cited
UNITED STATES PATENTS

| | | | |
|---|---|---|---|
| 3,168,594 | 2/1965 | Hoshi et al. | 260—87.5 |
| 3,435,098 | 3/1969 | Watanabe et al. | 260—897 |
| 3,358,054 | 12/1967 | Hardt et al. | 260—878 |
| 3,381,056 | 4/1968 | Beer | 260—878 |

FOREIGN PATENTS

| | | | |
|---|---|---|---|
| 927,174 | 5/1963 | Great Britan | 260—878 |
| 1,020,704 | 2/1966 | Great Britan | 260—878 |

JOSEPH L. SCHOFER, Primary Examiner

A. HOLLER, Assistant Examiner

U.S. Cl. X.R.

260—884, 885

S-161

UNITED STATES PATENT OFFICE
CERTIFICATE OF CORRECTION

Patent No. 3,639,512　　　　　　　　　　　Dated February 1, 1972

Inventor(s) SUGIMOTO ET AL

It is certified that error appears in the above-identified patent and that said Letters Patent are hereby corrected as shown below:

Claim 1, line 22, after "a", insert -- co --.

Signed and sealed this 6th day of June 1972.

(SEAL)
Attest:

EDWARD M. FLETCHER, JR.　　　　　　ROBERT GOTTSCHALK
Attesting Officer　　　　　　　　　　Commissioner of Patents